Patented July 1, 1924.

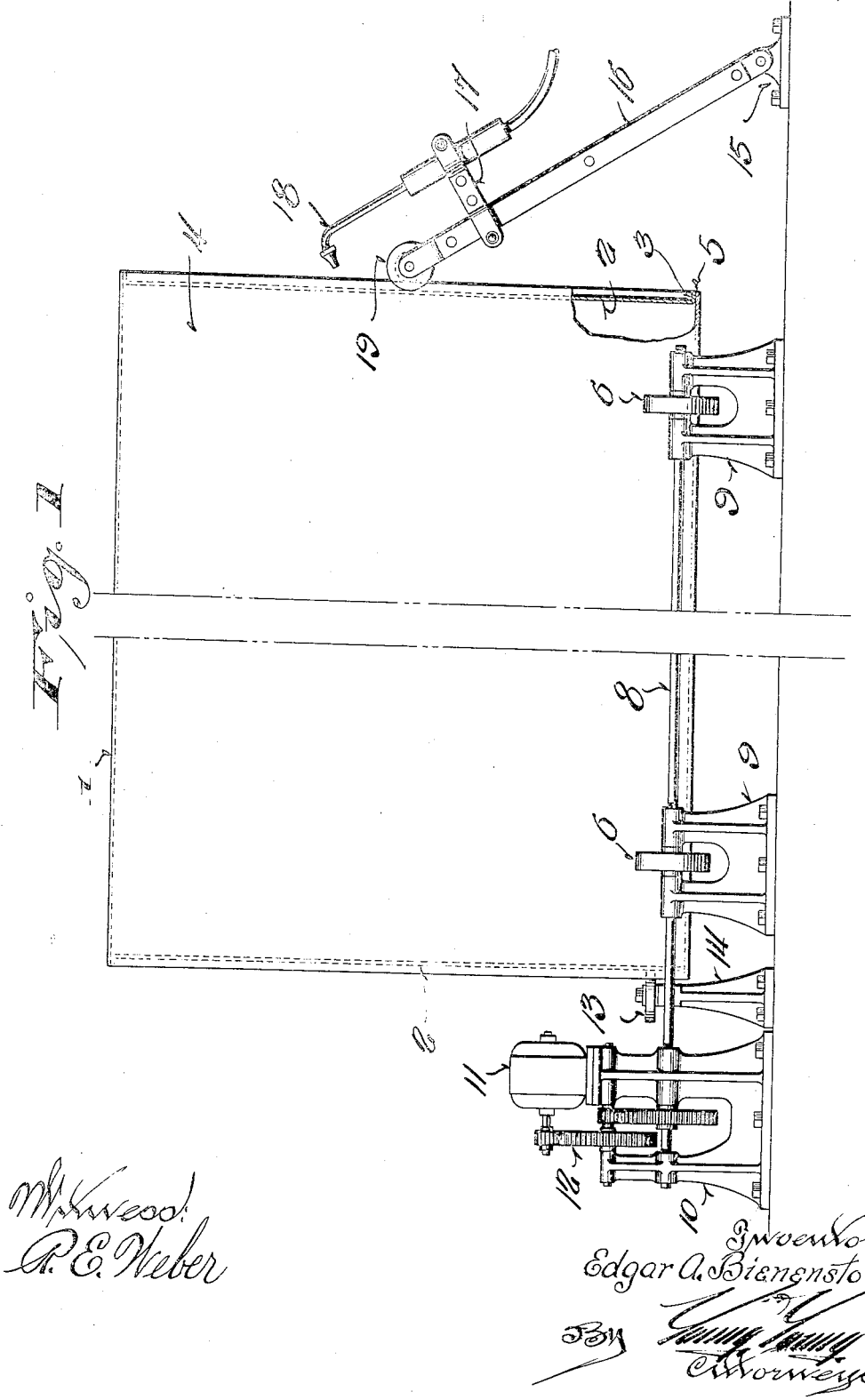

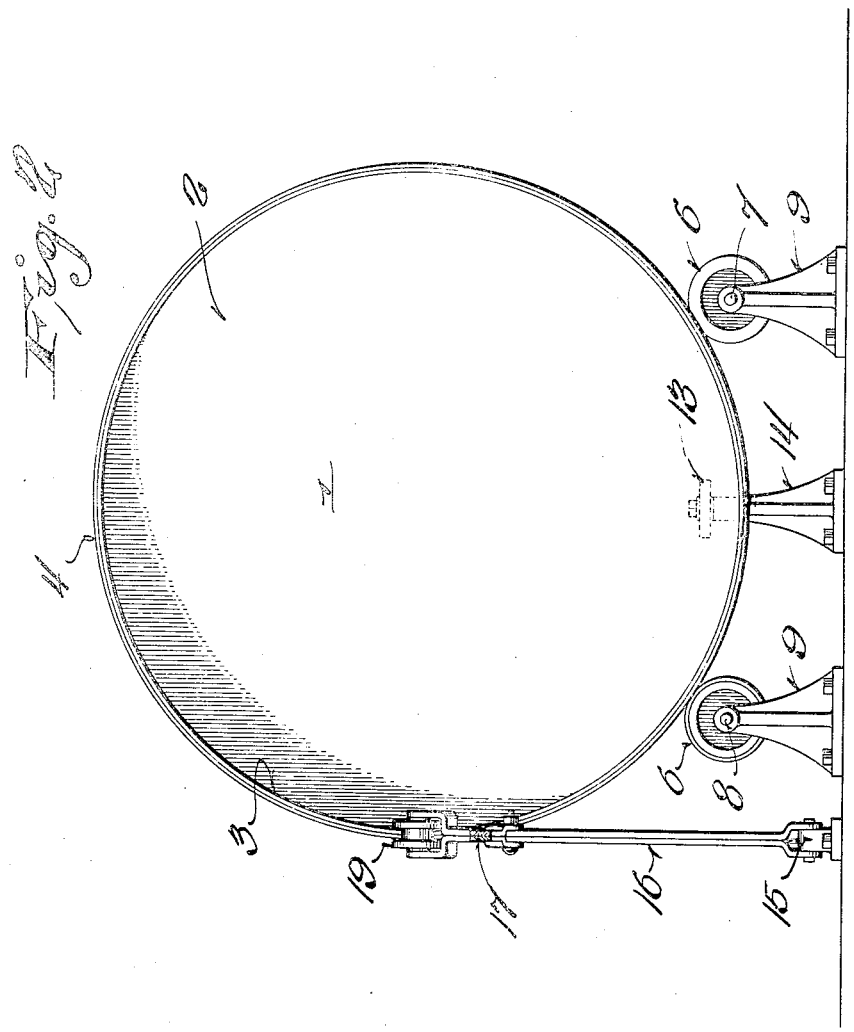

1,499,499

UNITED STATES PATENT OFFICE.

EDGAR A. BIENENSTOK, OF MILWAUKEE, WISCONSIN, ASSIGNOR TO MILWAUKEE TANK WORKS, OF MILWAUKEE, WISCONSIN.

WELDING MACHINE.

Application filed July 2, 1923. Serial No. 649,017.

*To all whom it may concern:*

Be it known that I, EDGAR A. BIENENSTOK, a citizen of the United States, and resident of Milwaukee, in the county of Milwaukee and State of Wisconsin, have invented certain new and useful Improvements in Welding Machines; and I do hereby declare that the following is a full, clear, and exact description thereof.

This invention pertains to seam welding apparatus and has primarily for its object to provide an apparatus wherein provision is made for imparting movement to the article welded, while the welding torch is anchored and guided with relation to the seam to be operated upon.

A further object resides in the provision of an apparatus embodying the above characteristics wherein the torch automatically adjusts itself with relation to the article to be welded and the same is guided in proper alignment with the seam to be operated upon.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawings, Figure 1 is an elevational view of an apparatus constructed in accordance with the present invention.

Figure 2 is an end elevation of the same.

Referring now more particularly to the accompanying drawings wherein the apparatus illustrated is particularly designed for welding the end seams of cylindrical tanks, the numeral 1 designates the tank operated upon, which is provided with heads 2 having peripheral flanges 3 which engage the side wall 4 and cooperate therewith to form a track 5.

The tank 1 is supported on the spaced rollers 6 which are mounted on the shafts 7 and 8, the shafts being journaled in the standards 9. As best illustrated in Figure 1, the shaft 8 is extended rearwardly of the machine and journaled in the motor standard 10 on which is mounted a motor 11 operatively connected with the shaft 8 by means of the gear train 12. Thus it will be seen that by means of the motor 11 power is transmitted to the shaft 8 which, through the rollers 6 secured thereto and engaging the side wall 4, rotates the tank 1 during the welding operation.

Engaging the rear head 2 of the tank is a horizontal roller 13 carried by the standard 14, which roller prevents rearward longitudinal movement of the tank on the rollers 6.

Anchored to the floor or any suitable base, forward of the rotating mechanism above described, is a bracket 15 having pivoted thereto an arm 16 on which is adjustably mounted the bracket 17 that serves to carry a welding torch 18 of conventional or standard construction. The upper end of the arm 16 carries a grooved roller 19 adapted to engage the track 5 and travel thereon as the tank 1 is rotated. Thus it will be seen that the torch 18, after being properly adjusted in its bracket 17, so as to bring it into the desired position with relation to the annular seam between the side wall 4 and head 2, will be held and guided in that relative position as the tank is rotated. Attention is also directed to the fact that because of the pivotal mounting of the arm 16, the same will readily accommodate itself to tanks of various lengths and will further compensate for irregularities in the edges of the tank.

From the foregoing description taken in connection with the drawings, it is obvious that a comparatively simple apparatus has been provided which will readily accommodate tanks of various dimensions, and greatly facilitates the seam welding operation, and reduces the cost of the same by eliminating manual assistance.

It is further obvious that while I have shown and described an apparatus for welding the annular end seams, the invention, with slight modification, readily adapts itself to the welding of longitudinal or straight seams.

I claim:

1. In a seam welding apparatus the combination of, means for imparting movement to the article to be welded, a pivotally anchored arm, a grooved roller carried by said arm and engageable with the edge of said article, whereby the arm is guided with relation thereto, and a welding torch carried by said arm.

2. In a seam welding apparatus for cylindrical tanks the combination of, spaced rollers for supporting said tank, means for driving certain of said rollers to impart rotary movement to the tank, a pivotal arm positioned adjacent one end of the tank, a grooved roller carried by the arm and engageable with the edge of said tank whereby the arm is guided with relation thereto, and a torch carried by said arm.

In testimony that I claim the foregoing I have hereunto set my hand at Milwaukee, in the county of Milwaukee and State of Wisconsin.

EDGAR A. BIENENSTOK.